United States Patent
Kato et al.

(10) Patent No.: US 10,013,628 B2
(45) Date of Patent: Jul. 3, 2018

(54) INFORMATION PROCESSING APPARATUS AND INFORMATION PROCESSING METHOD

(71) Applicant: CANON KABUSHIKI KAISHA, Tokyo (JP)

(72) Inventors: Masami Kato, Sagamihara (JP); Hirotaka Hachiya, Yokohama (JP)

(73) Assignee: Canon Kabushiki Ksiaha, Tokyo (JP)

( * ) Notice: Subject to any disclaimer, the term of this patent is extended or adjusted under 35 U.S.C. 154(b) by 302 days.

(21) Appl. No.: 14/662,488

(22) Filed: Mar. 19, 2015

(65) Prior Publication Data

US 2015/0278634 A1 Oct. 1, 2015

(30) Foreign Application Priority Data

Mar. 31, 2014 (JP) .................................. 2014-073728

(51) Int. Cl.
*G06K 9/46* (2006.01)
*G06K 9/00* (2006.01)

(52) U.S. Cl.
CPC ....... *G06K 9/4628* (2013.01); *G06K 9/00986* (2013.01)

(58) Field of Classification Search
CPC .................. G06K 9/00986; G06K 9/4628
See application file for complete search history.

(56) References Cited

U.S. PATENT DOCUMENTS

| | | | |
|---|---|---|---|
| 7,428,066 B2 | 9/2008 | Shinomiya et al. | |
| 7,978,905 B2 | 7/2011 | Yamamoto et al. | |
| 8,385,631 B2 | 2/2013 | Yamamoto et al. | |
| 8,391,306 B2 | 3/2013 | Ito et al. | |
| 9,311,403 B1* | 4/2016 | Ioffe | G06F 17/30247 |
| 2005/0063601 A1* | 3/2005 | Kamata | H04N 19/60 382/243 |
| 2005/0213760 A1* | 9/2005 | LeComte | H04N 7/1675 380/217 |
| 2007/0041638 A1* | 2/2007 | Liu | G06K 9/6282 382/170 |
| 2008/0082468 A1* | 4/2008 | Long | G06K 9/00147 706/12 |

(Continued)

FOREIGN PATENT DOCUMENTS

JP 2013-068884 A 4/2013
JP 2013145954 A 7/2013

OTHER PUBLICATIONS

Ella Bingham, et al., "Random projection in dimensionality reduction: Applications to image and text data," KDD2001, 2001, pp. 1-6.

(Continued)

*Primary Examiner* — Edward Park
(74) *Attorney, Agent, or Firm* — Fitzpatrick, Cella, Harper & Scinto

(57) ABSTRACT

A plurality of random number sequences are generated using a plurality of random number seeds stored in a memory, and a plurality of base vectors are generated based on the plurality of random number sequences. A transformation source vector is transformed into a lower-dimensional vector by performing random projection for the transformation source vector using the plurality of generated base vectors.

13 Claims, 11 Drawing Sheets

(56) References Cited

U.S. PATENT DOCUMENTS

2008/0219515 A1* 9/2008 Namgoong .......... G06K 9/0061
382/117

OTHER PUBLICATIONS

Nicolas Pinto, et al., "Beyond simple features: A large-scale feature search approach to unconstrained face recognition," Automatic Face & Gesture Recognition and Workshops (FG 2011), 2011 IEEE International Conference on, IEEE (2011), pp. 1-8.
Richard Socher, et al., "Learning continuous phrase representations and syntactic parsing with recursive neural networks," Proceedings of the NIPS-2010 Deep Learning and Unsupervised Feature Learning Workshop, 2010, pp. 1-9.
Japanese Office Action issued in corresponding Japanese Application No. 2014073728 dated Apr. 23, 2018.

* cited by examiner

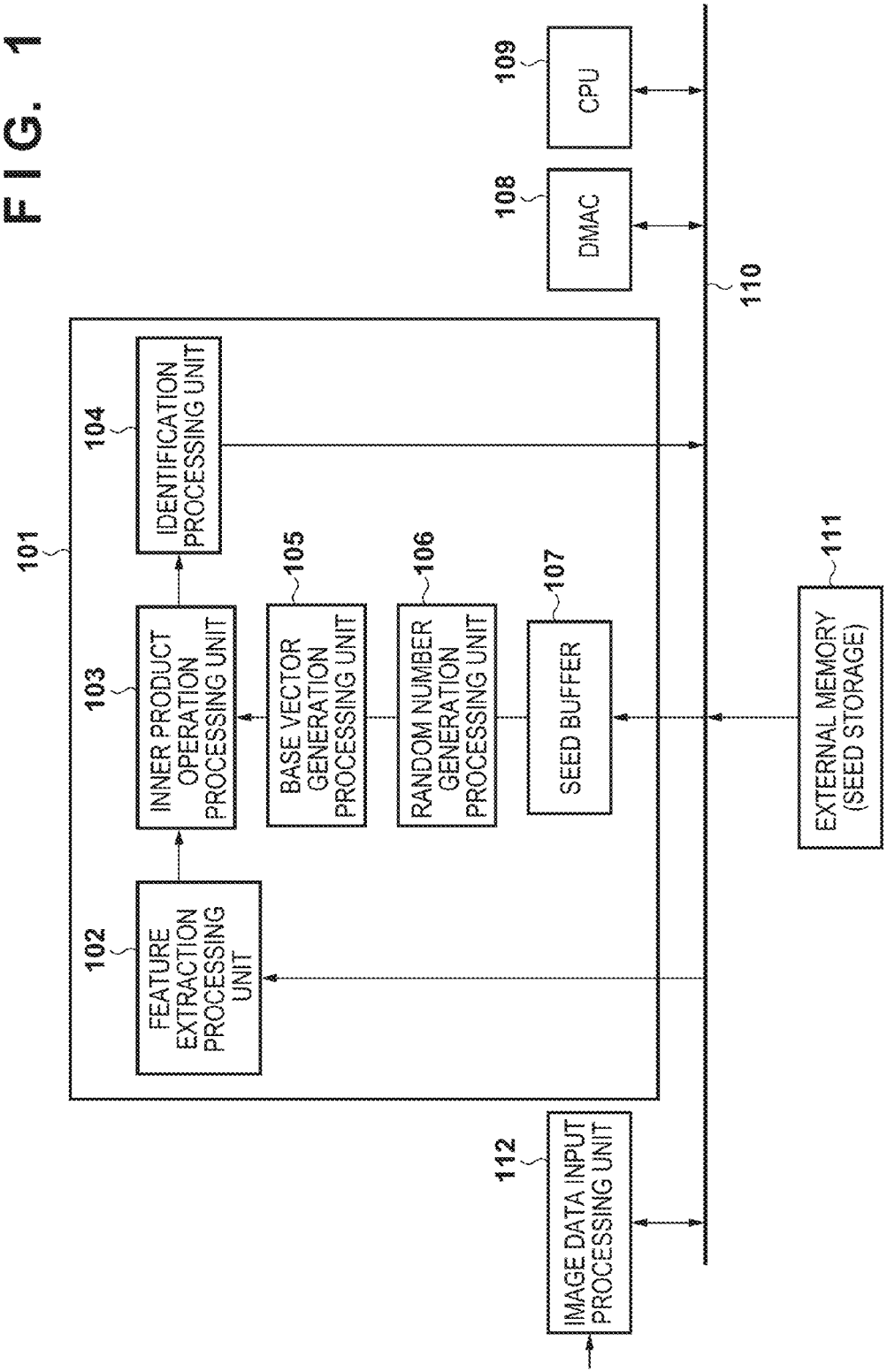

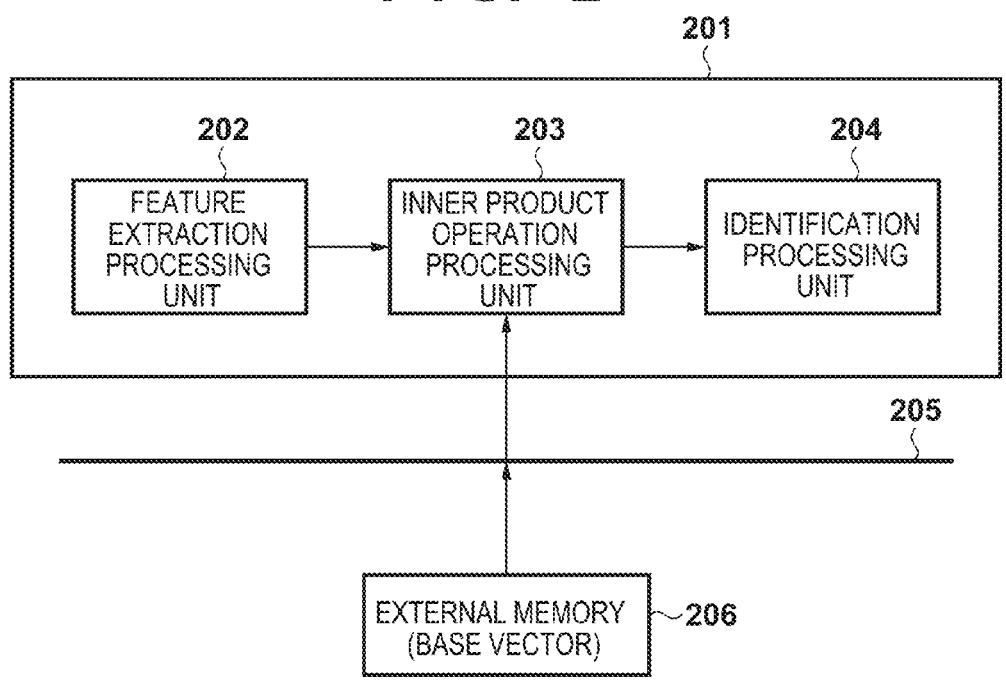
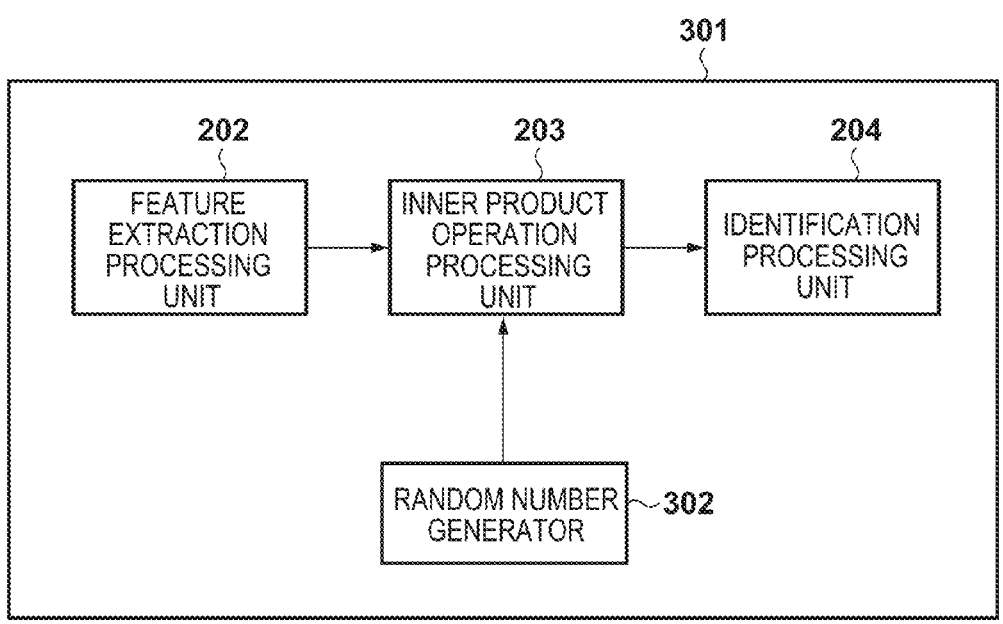

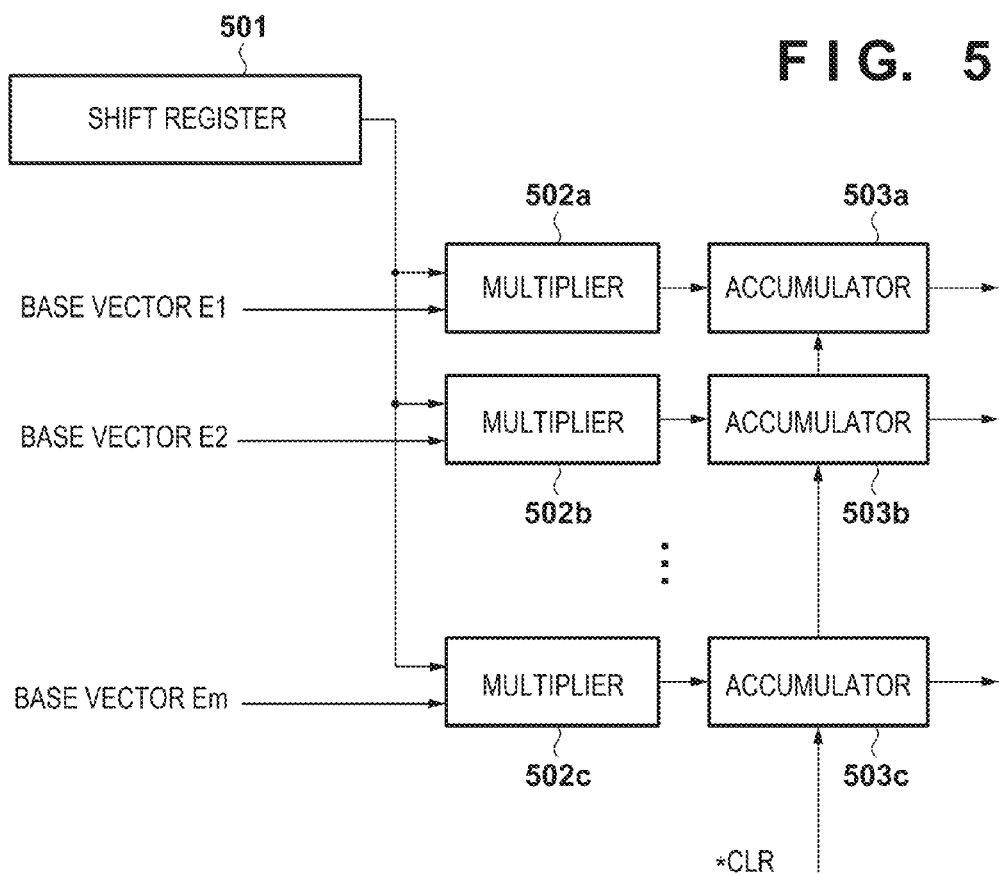

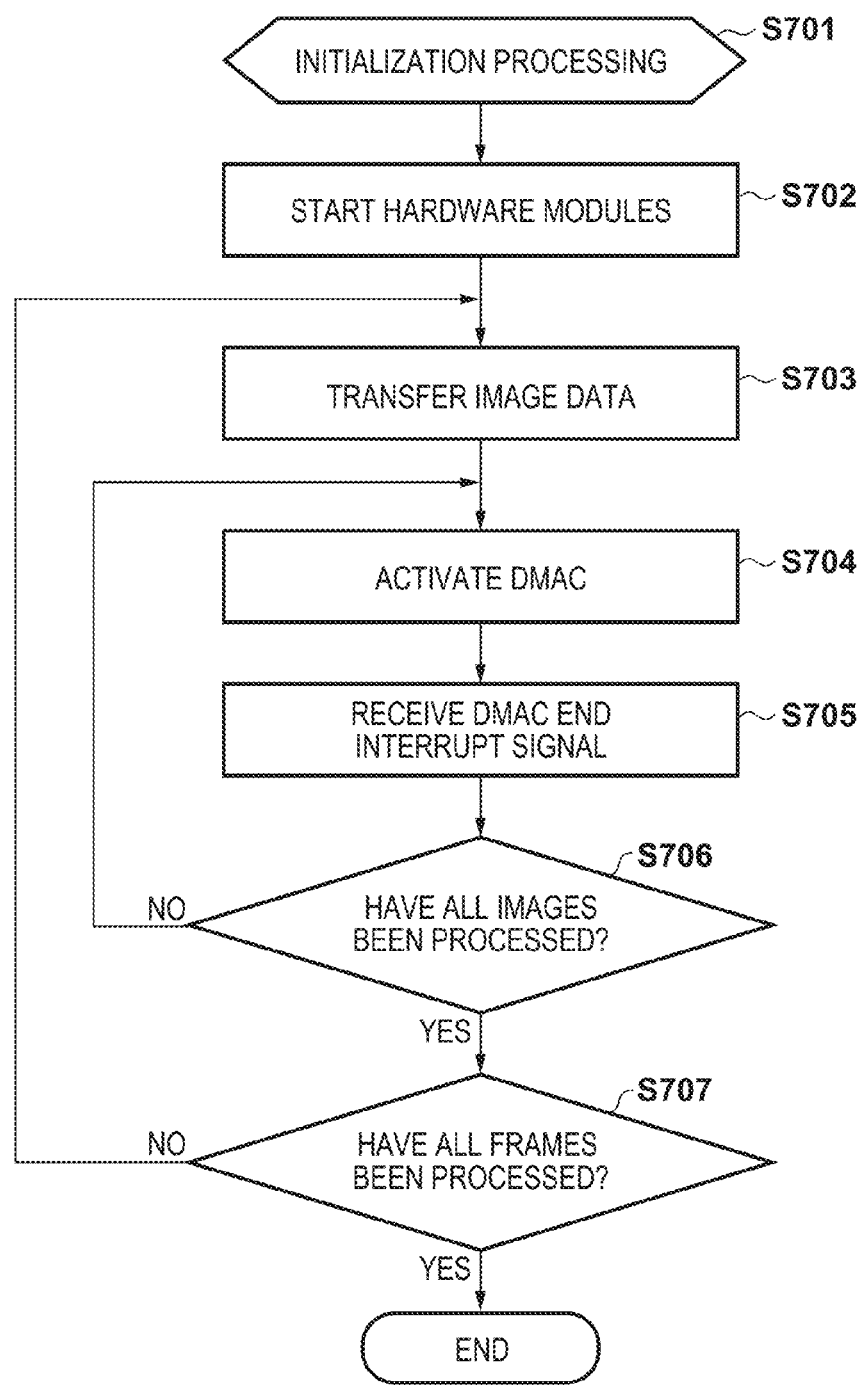
F I G. 7

FIG. 14

| ADDRESS 0 | Seed1 | b1 |
|---|---|---|
| ADDRESS 1 | Seed2 | b2 |
| ⋮ | ⋮ | ⋮ |
| ADDRESS k | Seedk | bk |

INFORMATION PROCESSING APPARATUS AND INFORMATION PROCESSING METHOD

BACKGROUND OF THE INVENTION

Field of the Invention

The present invention relates to a technique of performing projection operation using random numbers.

Description of the Related Art

Dimension reduction/identification technology based on random projection is attracting attention. For example, patent literature 1 (Japanese Patent Laid-Open No. 2013-68884) discloses a technique of efficiently generating a hash function based on a random number. Also, a non-patent literature 1 ("Random projection in dimensionality reduction: Applications to image and text data", Bingham, KDD2001) discloses a case in which random projection is applied to dimension reduction of image data or text data. Non-patent literature 2 ("Beyond simple features: A large-scale feature search approach to unconstrained face recognition", Nicolas Pinto, David Cox, Automatic Face & Gesture Recognition and Workshops (FG 2011), 2011 IEEE International Conference on) discloses a technique related to object recognition using a filter based on a random number.

In random projection, a feature vector is projected onto a lower-dimensional space using base vectors generated based on random numbers. In general, when a projection operation is implemented, processing is performed with reference to base vectors (base vectors additionally calculated in advance) stored in a storage device, as disclosed in patent literature 1.

An example of the arrangement of a conventional identification apparatus using random projection will be described with reference to a block diagram shown in FIG. 2. Hardware 201 of accelerating identification processing includes a feature extraction processing unit 202, an inner product operation processing unit 203, and an identification processing unit 204. The inner product operation processing unit 203 transforms a feature vector generated by the feature extraction processing unit 202 into a lower-dimensional projection vector (in this case, processing is performed by random projection using random numbers). The inner product operation processing unit 203 executes a projection operation with reference to base vectors stored in an external memory 206 via a system bus 205. The external memory 206 is implemented by a low-speed mass memory such as a DRAM (Dynamic Random Access Memory). In a low-end system, due to the limitations on the bandwidth (the data transfer amount per unit time) of the system bus 205 and access delay to the external memory 206, the time taken to transfer the base vectors stored in the external memory 206 may exceed a processing time. Since the external memory 206 is generally shared with another processing (not shown), a bandwidth required for the system bus 205 is desirably narrow.

To decrease the transfer cost (necessary bandwidth) of the base vectors, a random number generator 302 may be incorporated in accelerator hardware 301, as shown in FIG. 3. If all the base vectors are formed from random number sequences, such implementation method may be adopted. However, as described in patent literature 1 and non-patent literature 2, if random number sequences which have been selected from a plurality of random number sequences under a desired condition are set as base vectors, the method shown in FIG. 3 cannot be applied.

SUMMARY OF THE INVENTION

The present invention has been made in consideration of the above problem, and provides a technique for more simply implementing projection processing at higher speed using selected ones of a plurality of random number sequences.

According to the first aspect of the present invention, there is provided an information processing apparatus comprising: an acquisition unit configured to acquire a transformation source vector; a random number generation unit configured to generate a plurality of random number sequences using a plurality of random number seeds stored in a memory; a base vector generation unit configured to generate a plurality of base vectors based on the plurality of random number sequences; and a transformation unit configured to transform the transformation source vector into a lower-dimensional vector by performing random projection for the transformation source vector using the plurality of generated base vectors.

According to the second aspect of the present invention, there is provided an information processing method for an information processing apparatus, comprising: an acquisition step of acquiring a transformation source vector; a random number generation step of generating a plurality of random number sequences using a plurality of random number seeds stored in a memory; a base vector generation step of generating a plurality of base vectors based on the plurality of random number sequences; and a transformation step of transforming the transformation source vector into a lower-dimensional vector by performing random projection for the transformation source vector using the plurality of generated base vectors.

Further features of the present invention will become apparent from the following description of exemplary embodiments (with reference to the attached drawings).

BRIEF DESCRIPTION OF THE DRAWINGS

FIG. 1 is a block diagram showing an example of the functional arrangement of an information processing apparatus;

FIG. 2 is a block diagram showing an example of the arrangement of a conventional identification apparatus using random projection;

FIG. 3 is a block diagram for explaining a method of incorporating a random number generator 302 in accelerator hardware 301;

FIG. 4 is a view schematically showing an operation according to equation (1);

FIG. 5 is a block diagram showing an example of the arrangement of an inner product operation processing unit 103;

FIG. 7 is a flowchart illustrating processing executed by a CPU 109;

FIG. 14 is a block diagram for explaining the management form of the random number seeds in the external memory 111.

DESCRIPTION OF THE EMBODIMENTS

Figure 6:
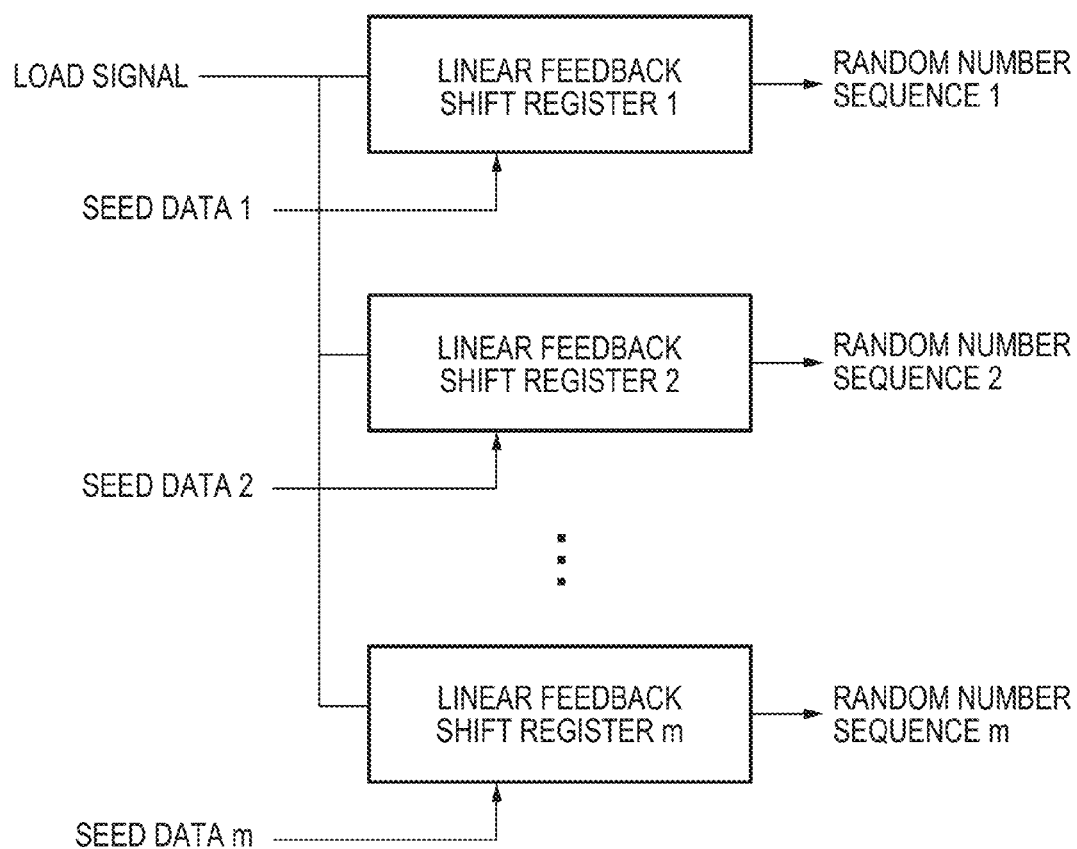
FIG. 6 is a block diagram showing an example of the arrangement of a random number generation processing unit 106.

Embodiments of the present invention will be described below with reference to the accompanying drawings. Note that the embodiments to be described below are merely examples when the present invention is practiced concretely, and are practical embodiments of arrangements described in the appended claims.

[First Embodiment]

An example of the arrangement of an information processing apparatus according to the embodiment will be described with reference to a block diagram shown in FIG. 1. In this embodiment, an n-dimensional feature vector (transformation source vector) extracted from an image is transformed (undergoes dimension reduction) into a k (k<n)-dimensional (lower-dimensional) feature vector by random projection, and recognition processing is performed for the image using the transformed k-dimensional feature vector.

All of an image data input processing unit 112, an operation unit 101, a DMAC (Direct Memory Access Controller) 108, a CPU 109, and an external memory 111 are connected to a system bus 110, and can perform data communication via the system bus 110.

The external memory 111 is a DRAM connected to the system bus 110 via a memory controller (not shown), in which k random number generation seeds (random number seeds) are registered.

The image data input processing unit 112 acquires data of an image from a memory (not shown) outside or inside the apparatus. The DMAC 108 transfers the image to the external memory 111 via the system bus 110.

After that, the DMAC 108 transfers, to the operation unit 101 for each pixel block, the image transferred to the external memory 111. Therefore, the operation unit 101 extracts a feature vector from the transferred pixel block, and the number of dimensions of the extracted feature vector is reduced by random projection. The operation unit 101 then performs identification processing using the feature vector whose number of dimensions has been reduced.

In response to an instruction from the CPU 109, the DMAC (Direct Memory Access Controller) 108 writes or reads data in or from the external memory 111. The CPU 109 controls the operation of each function unit shown in FIG. 1.

The operation unit 101 will be described in more detail.

A feature extraction processing unit 102 extracts an n-dimensional feature vector (a vector having n elements) from each pixel block transferred from the external memory 111. This feature vector is, for example, a data sequence based on various feature amounts determined for identification purpose, such as a histogram with bins for luminance gradient directions or a histogram with bins for the directions of the motion vector (optical flow or the like) of a pixel between a plurality of image frames.

An inner product operation processing unit 103 transforms the n-dimensional feature vector into a k-dimensional feature vector (projection vector) by performing an inner product operation of the n-dimensional feature vector obtained by the feature extraction processing unit 102 and each base vector generated by a base vector generation processing unit 105. By performing such transformation processing for each pixel block, it is possible to transform the n-dimensional feature vector of each pixel block into a k-dimensional feature vector.

When the inner product operation processing unit 103 transforms an n-dimensional feature vector X (a vector formed from elements x1 to xn) into a k-dimensional projection vector P (a vector formed from elements p1 to pk), the k-dimensional projection vector P (a vector of k rows×1 column) is given by:

$$P = W^T X + B \tag{1}$$

where X represents the n-dimensional feature vector (a vector of n rows×1 column) and B represents a k-dimensional bias term (a vector formed from elements b1 to bk and a vector of k rows×1 column). Furthermore, W represents an (n×k)-dimensional projection matrix (a matrix of n rows×k columns) formed from k n-dimensional base vectors (E1 to Ek). The base vectors E1 to Ek indicate data sequences decided based on random numbers, and k n-dimensional vectors selected from random number sequences as a number of base candidates under a predetermined condition.

FIG. 4 schematically shows the operation according to equation (1). For example, an element p1 of the projection vector P (401) can be calculated as the sum of the inner product value of the base vector E1 of the projection matrix W (402) and the feature vector X (403) and the element b1 of the bias term B (404), as given by:

$$p1 = E1^T X + b1 \tag{2}$$

An example of the arrangement of the inner product operation processing unit 103 will be described with reference to a block diagram shown in FIG. 5. The feature vector X input to the inner product operation processing unit 103 is stored in a shift register 501, and supplied to each of m (m≤k) multipliers 502a to 502c.

The m multipliers 502a to 502c parallelly operate to increase the speed of the projection operation, and each multiplier multiplies each element of the base vector generated by the base vector generation processing unit 105 by a corresponding element of the feature vector X supplied from the shift register 501. For example, the multipliers shown in FIG. 5 are sequentially referred to as multipliers 1, 2, . . . , m from top to bottom and a base vector input to multiplier j (1≤j≤m) is represented by Ej=(ej1, . . . , ejn). In this case, multiplier j obtains (ej1×x1, ej2×x2, . . . , ejn×xn).

Similarly to the multipliers, m accumulators 503a to 503c parallelly operate, and each accumulator obtains the sum of the multiplication results obtained by corresponding one of the multipliers 502a to 502c. For example, the accumulators shown in FIG. 5 are sequentially referred to as accumulators 1, 2, . . . , m from top to bottom and a base vector input to multiplier j is represented by Ej=(ej1, . . . , ejn). In this case, accumulator j obtains (ej1×x1+ej2×x2+ . . . +ejn×xn).

That is, each set of the multiplier and accumulator obtains the inner product result of the base vector and feature vector X. In FIG. 5, since there are m sets of multipliers and accumulators, it is possible to obtain m inner product results of the base vectors and feature vector X.

The inner product operation processing unit 103 sequentially performs, for each clock, multiplication of each element of the feature vector X stored in the shift register 501 and a corresponding element of each of the base vectors E1 to Em, and accumulation of the multiplication results. That is, the inner product operation processing unit 103 completes the inner product operation for the m base vectors in n clock cycles.

Note that with respect to addition of the bias term, the bias term may be added to the inner product result (when an element of the bias term corresponding to the base vector Ej input to multiplier j is represented by bj, accumulator j obtains (ej1×x1++. . . +ejn×xn+bj). However, the above inner product operation and addition of the bias term B may be performed as follows.

That is, the feature extraction processing unit 102 adds an element with an element value of 1 to the elements of the feature vector X to generate an (n+1)-dimensional feature vector X' formed from the elements x1 to xn and the element with an element value of 1. Furthermore, for each generated base vector E, the base vector generation processing unit 105 adds an element of the bias term corresponding to the base vector to the n elements of the base vector E to generate an (n+1)-dimensional base vector E'. Each set of the multiplier and accumulator performs an inner product operation of the feature vector X' and the base vector E'.

Therefore, in consideration of the bias term, the element values p1 to pm of the projection vector are calculated in (n+1) clocks. Note that *CLR represents a signal for terminating the inner product operation of the feature vector and base vectors and addition of the bias term, and initializing the accumulators after outputting the elements of the projection vector. The inner product operation processing unit 103 can parallelly calculate and output m elements of the k elements forming the projection vector P.

The projection matrix W supplied to the inner product operation processing unit 103, that is, generation of k n-dimensional base vectors will be described. A random number generation processing unit 106 and the base vector generation processing unit 105 generate the k base vectors.

In this embodiment, the external memory 111 stores a random number seed (data for generating a unique random number sequence) for each base vector. In this embodiment, since k base vectors are generated, the external memory 111 stores k random number seeds.

More specifically, as shown in FIG. 14, sets of k random number seeds (Seed1 to Seedk) and the elements (b1 to bk) of the bias term are registered in the external memory 111. The random number seeds Seed1 to Seedk are used to generate the base vectors E1 to Ek, respectively, and the elements b1 to bk are bias terms corresponding to the base vectors E1 to Ek, respectively. The DMAC 108 transfers these sets to a seed buffer 107. Note that a bias term will be described as part of a random number seed. For example, the bias term b1 will be described as part of the random number seed Seed1.

The CPU 109 activates the DMAC 108 at an appropriate timing, and causes it to transfer the k random number seeds stored in the external memory 111 to the seed buffer 107 via the system bus 110. The seed buffer 107 is implemented by a high-speed SRAM (Static Random Access memory). The seed buffer 107 is implemented by a small-capacity double buffer memory for which a readout operation by the random number generation processing unit 106 and writing operation by the DMAC 108 can be executed at the same time.

The random number generation processing unit 106 generates k random number sequences using the k random number seeds transferred to the seed buffer 107. An example of the arrangement of the random number generation processing unit 106 will be described with reference to a block diagram shown in FIG. 6.

A conventionally known method such as a random number generation method by an M-sequence may be used to generate random numbers. The random number sequence length of the M-sequence is decided based on the number of dimensions of the base vectors and the number of random number vectors as base vector selection candidates. For example, the random number sequence length which can generate random numbers with a period exceeding "the number of dimensions of the feature vector×the number of dimensions of the projection vector×the number of base vector candidates". The base vector candidates indicate vectors serving as candidates to be selected base vectors.

As shown in FIG. 6, the random number generation processing unit 106 includes m linear feedback shift registers (linear feedback shift registers 1 to m) in accordance with the number m of parallel processes of the inner product operation units shown in FIG. 5, and each register has a predetermined register length. Random seeds 1 to m transferred to the seed buffer 107 are input to linear feedback shift registers 1 to m, respectively, thereby parallelly generating M-sequence random numbers. A load signal is a load signal of each shift register value, and is a signal for loading the random number seeds read out from the seed buffer 107 into the linear feedback shift registers at a predetermined timing. If the inner product operation processing unit 103 generates a k-dimensional projection vector, the random number generation processing unit 106 generates k random number sequences based on the k seeds (when base vectors are generated from uniform random numbers).

Referring back to FIG. 1, the base vector generation processing unit 105 extracts k base vectors corresponding to a predetermined random number distribution from the k random number sequences generated by the random number generation processing unit 106. If a base vector is formed from a uniform random number, a uniform random number sequence generated from the random number seed is used as a base vector intact. On the other hand, if a base vector is formed from a normal random number, an average random number sequence of a plurality of uniform random number sequences is generated, and a base vector approximate to a normal random number is extracted from the average random number sequence. As described above, the base vector generation processing unit 105 adds data corresponding to the bias term to the base vector sequence.

According to this embodiment, random number seeds corresponding to base vectors are registered in the external memory 111 instead of the base vectors, and the operation unit 101 acquires the random number seeds from the external memory 111, and generates base vectors based on the acquired random number seeds. This can reduce the data amount transferred from the external memory 111 to the operation unit 101, as compared with a case in which the base vectors are registered in the external memory 111.

The inner product operation processing unit 103 performs an inner product operation of each of the base vectors E1 to Em sequentially generated by the base vector generation processing unit 105 and the feature vector X stored in the shift register 501. Upon completion of the inner product operations of the base vectors E1 to Ek and the feature vectors X, the elements p1 to pk of the projection vector P are decided, thereby confirming the projection vector P. The inner product operation processing unit 103 transfers the thus confirmed projection vector P to an identification processing unit 104.

The identification processing unit 104 executes specified determination processing using the projection vector P, thereby performing identification processing for an object within an image. For example, the identification processing unit 104 executes the determination processing based on the Hamming distance or Euclidean distance to a correct projection vector as correct data obtained in advance by learning. Alternatively, the identification processing unit 104 may execute the determination processing using a discriminator such as an SVM (Support Vector Machine), a neural network, or boosting. Identification processing using feature amounts within an image is a well-known technique and a detailed description thereof will be omitted. The identification processing unit 104 transfers the identification result (determination result) to the external memory 111 via the system bus 110, and stores it in the external memory 111. The output destination of the identification result is not limited to the external memory 111, as a matter of course. The identification result may be transferred to an external apparatus or displayed on a display device (not shown).

Processing performed by the CPU 109 to execute each process described above will be explained with reference to FIG. 7 showing the flowchart of the processing. The CPU 109 executes the processing according to the flowchart shown in FIG. 7 by executing processing using a computer program and data stored in a memory such as the external memory 111.

In step S701, the CPU 109 performs initialization processing of respective hardware components (including the respective function units shown in FIG. 1) constituting the information processing apparatus. This initialization processing includes processing of setting the operation parameters of the respective function units. In step S702, the CPU 109 sends an operation start instruction to each of the image data input processing unit 112, operation unit 101, and DMAC 108.

In step S703, the CPU 109 instructs the DMAC 108 to transfer an image acquired by the image data input processing unit 112 to the external memory 111, and the DMAC 108 transfers the image.

In step S704, upon detecting that the image has been transferred by an interrupt signal output from the DMAC 108, the CPU 109 instructs the DMAC 108 to transfer the image stored in the external memory 111 for each pixel block and to transfer the random number seeds. The DMAC 108 transfers the image stored in the external memory 111 to the feature extraction processing unit 102 for each pixel block according to a descriptor designated by the CPU 109, and also transfers the random number seeds stored in the external memory 111 to the seed buffer 107.

Figure 9:
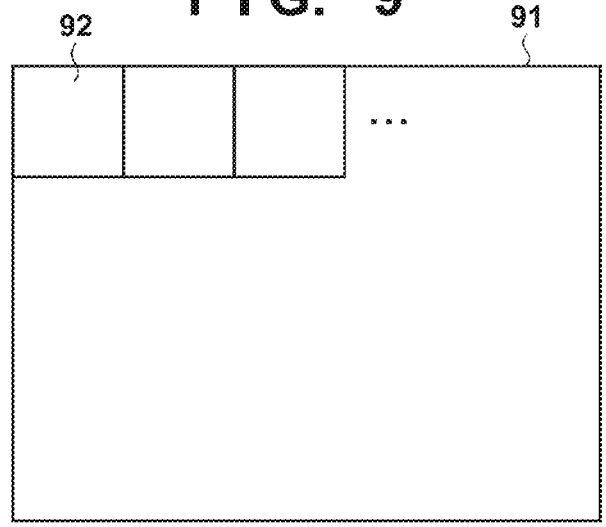
FIG. 9 is a view for explaining pixel blocks.

The pixel blocks will be described with reference to FIG. 9. When an image 91 is divided into a plurality of regions, each pixel block 92 indicates a block formed from pixels within each region. In this embodiment, assume that a vector representing a feature within the pixel block 92 indicates a feature amount (feature vector). In this case, the entire image is processed by executing processing for each pixel block. Therefore, an identification result by the identification processing unit 104 is obtained for each pixel block.

Every time the external memory 111 transfers a pixel block, the feature extraction processing unit 102 extracts a feature vector from the pixel block, and sends the extracted feature vector to the inner product operation processing unit 103.

When the random number seeds are transferred to the seed buffer 107, the random number generation processing unit 106 generates random number sequences using the random number seeds, and the base vector generation processing unit 105 generates base vectors using the random number sequences, and sends the generated base vectors to the inner product operation processing unit 103.

The inner product operation processing unit 103 performs an inner product operation of the feature vector sent from the feature extraction processing unit 102 and each base vector sent from the base vector generation processing unit 105, thereby generating a projection vector.

The inner product operation processing unit 103 parallelly executes processing for the m base vectors, as shown in FIG. 5. Assuming that the number of dimensions of the projection vector is k, the projection vector is generated in the processing time of inner product operations for the base vectors, the number of which is represented by the ceiling function (k/m).

Upon receiving the projection vector calculated by the inner product operation processing unit 103, the identification processing unit 104 starts identification processing. The DMAC 108 transfers the identification result of the identification processing unit 104 to the external memory 111.

Upon completion of transferring the identification result to the external memory 111, the DMAC 108 outputs an interrupt signal to the CPU 109. Thus, in step S705, the CPU 109 receives the interrupt signal.

In step S706, the CPU 109 determines whether the processes in steps S704 and S705 have been performed for all the pixel blocks. If it is determined that the processes in steps S704 and S705 have been performed for all the pixel blocks, the process advances to step S707; otherwise, the processes in steps S704 and S705 are executed for an unprocessed pixel block.

In step S707, the CPU 109 determines whether the processes in steps S703 to S706 have been performed for all frames. If it is determined that the processes in steps S703 to S706 have been performed for all the frames, the processing according to the flowchart shown in FIG. 7 ends; otherwise, the processes in steps S703 to S706 are executed for an unprocessed frame.

Figure 8:
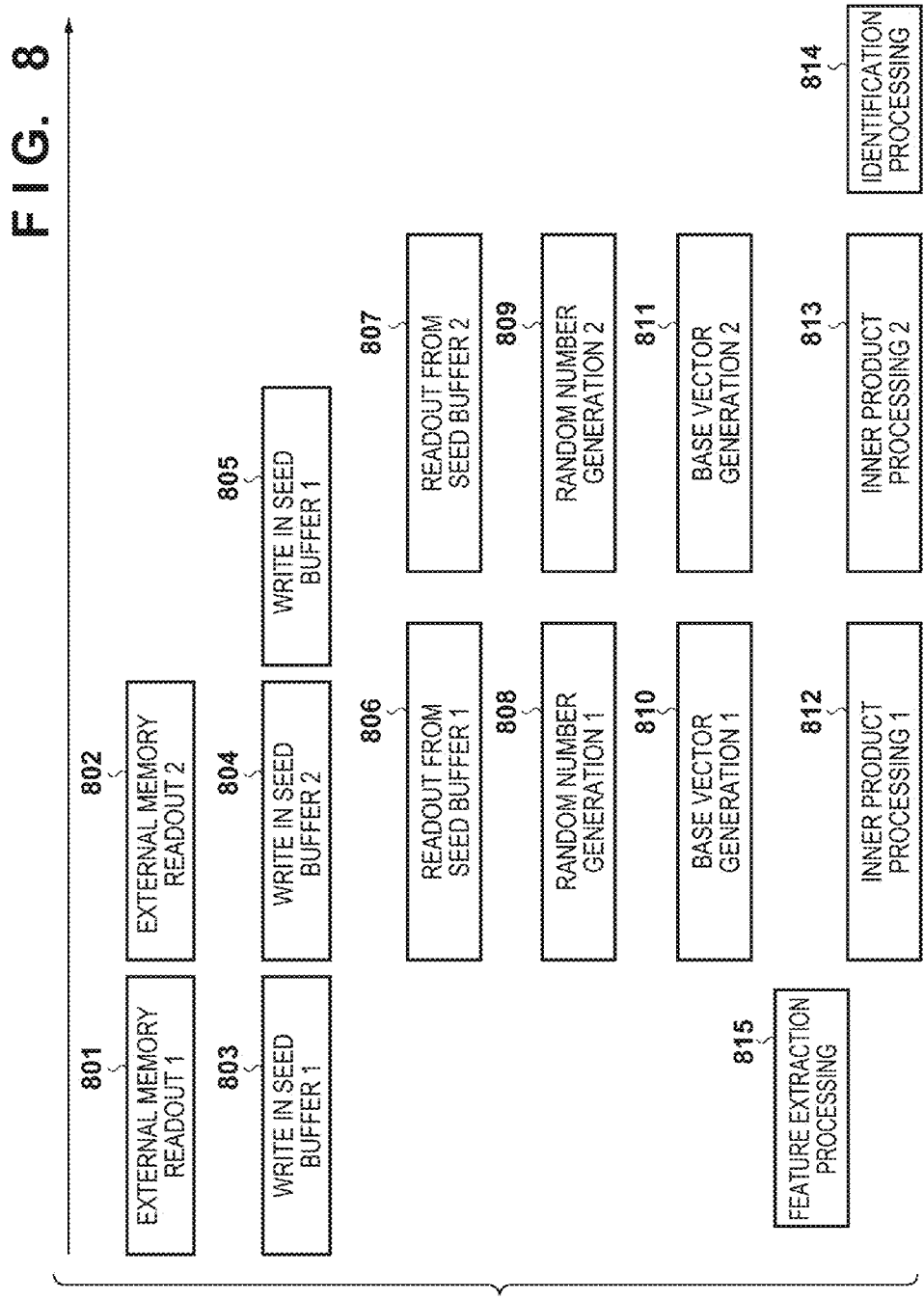
FIG. 8 is a timing chart showing the operation of the information processing apparatus.

A timing chart showing the operation of the information processing apparatus will be described with reference to FIG. 8. FIG. 8 is a timing chart showing an operation for one given pixel block. FIG. 8 shows a case in which the parallelism of the inner product operation processing unit 103 and random number generation processing unit 106 is k/m=2.

The DMAC 108 transfers the random number seeds stored in the external memory 111 to the seed buffer 107 (801, 803). The feature extraction processing unit 102 executes feature extraction processing in parallel to the transfer operation (815). After the end of the feature extraction processing (815) and transfer of the random number seeds (801, 803), processing of reading out the random number seeds from the seed buffer 107 (806), random number generation processing (808), and base vector generation processing (810) are sequentially executed. Inner product operation processing is executed for generated base vectors and the stored feature vector (812). At this time, inner product operations the number of which is equal to that of base vectors parallelly processed by the inner product operation processing unit 103 are executed. In parallel to the series of processes, transfer of the random number seeds starts (802, 804) for next inner product operation processing (813). After the end of the inner product operation processing (812), random number generation processing (809) and base vector generation processing (811) are sequentially executed with reference to the random number seeds stored in the seed buffer 107. Furthermore, inner product operations of the generated base vectors and the feature vector extracted in the feature extraction processing 815 are executed (813). After the end of the inner product processing (813), identification processing (814) starts for an obtained projection vector. In this manner, in this embodiment, a projection operation is executed while dynamically generating base vectors based on a small number of random number seeds stored in the external memory.

As described above, in this embodiment, it is possible to reduce the use size of the external memory to a fraction of several to several hundreds by holding a small number of random number seeds for generating base vectors in the external memory instead of holding multidimensional base vectors. This can reduce the bandwidth required for the system bus 110 to a fraction of several to several hundreds. It is, therefore, possible to perform projection operation processing at high speed by random projection based on selective random number sequences even in a system with a limited bus bandwidth.

[Second Embodiment]

Figure 10:
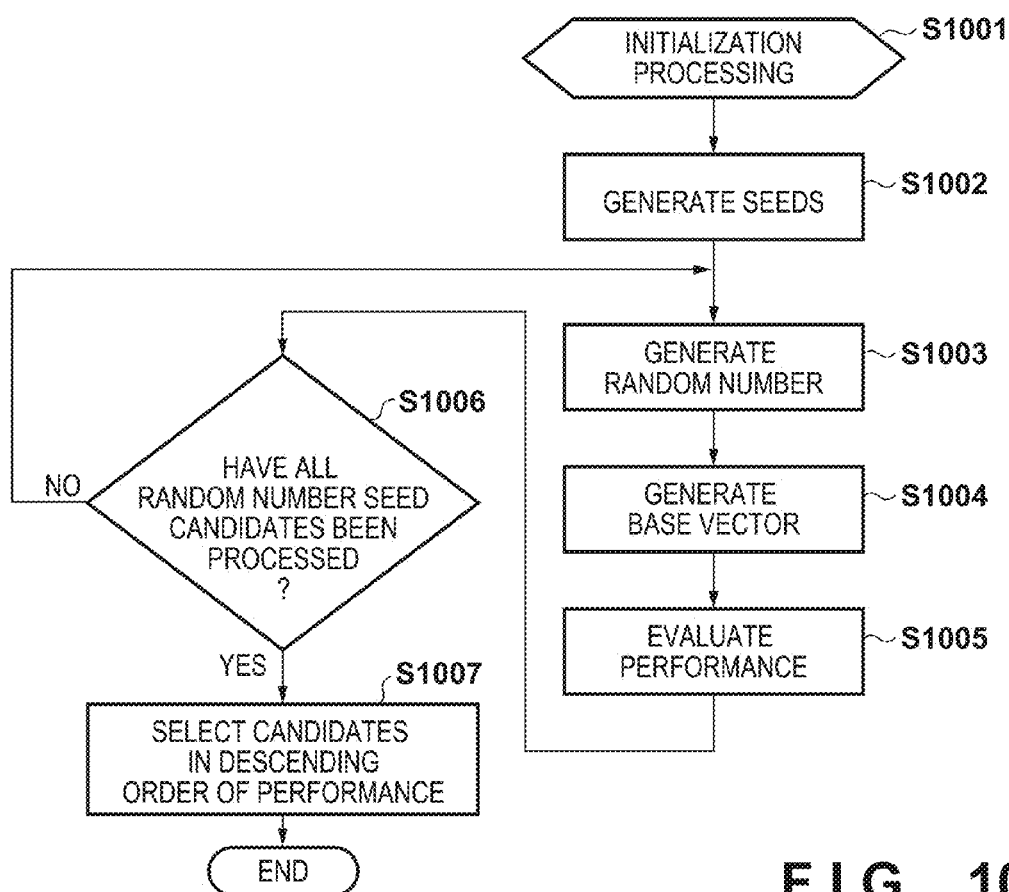
FIG. 10 is a flowchart illustrating processing of generating random number seeds, and registering them in an external memory 111.

In this embodiment, the difference from the first embodiment is that a CPU 109 generates (learns) desired random number seeds, and registers them in an external memory 111. The difference from the first embodiment will be mainly described below, and a description of the same points as in the first embodiment will be omitted. Processing of generating random number seeds and registering them in the external memory 111 will be described with reference to a flowchart shown in FIG. 10.

In step S1001, the CPU 109 initializes respective function units of an operation unit 101. In this initialization processing, for example, if a random number generation processing unit 106 can change the random number period (random number sequence length) and feedback arrangement of a linear feedback shift register by parameters, the parameters about the period and feedback arrangement are set. The random number sequence length is decided based on "the number of dimensions of a feature vector×the number of dimensions of a projection vector×the number of base vector candidates", as described above. For an M-sequence random number generator, the feedback arrangement is determined based on the sequence length.

In step S1002, the CPU 109 generates a sufficient number of random number seed candidates. Any generation method may be used. The CPU 109 also generates a bias term corresponding to each of the generated random number seed candidates using a random number. In step S1003, the CPU 109 sets an unselected one of the generated random number seed candidates in one of the linear feedback shift registers of the random number generation processing unit 106, and causes the linear feedback shift register to generate a random number sequence from the set random number seed candidate.

In step S1004, a base vector generation processing unit 105 generates one base vector based on the random number sequence generated in step S1003. In step S1005, an inner product operation processing unit 103 performs an inner product operation of the base vector generated in step S1004 and a feature vector extracted in advance from each of a plurality of learning images, and adds the bias term corresponding to the random number seed candidate used to generate the base vector.

The CPU 109 evaluates the base vector using "a result (value) of adding a bias term b to an inner product result of a feature vector x of a learning image and a base vector E corresponding to the random number seed candidate selected in step S1003" which is obtained for each of the plurality of learning images, as given by:

$$\frac{1}{N}\sum_{i=1}^{N} L(E^T x_i + b) + \lambda b \quad (3)$$

where N represents the number of data and $\lambda$ represents a bias weight parameter. Furthermore, L(z) represents a function indicating an error, and is defined by $$L(z) \equiv \begin{cases} 0 & (z \geq 0) \\ z^2 & (z < 0) \end{cases} \quad (4)$$

The CPU 109 stores a set of the random number seed candidate selected in step S1003 and the evaluation result (evaluation value) obtained in step S1005 in the external memory 111.

In step S1006, the CPU 109 determines whether the processes in steps S1003 to S1005 have been performed for all the generated random number seed candidates. If it is determined that the processes in steps S1003 to S1005 have been performed for all the generated random number seed candidates, the process advances to step S1007; otherwise, the process returns to step S1003 to perform the subsequent processing for an unselected random number seed candidate.

In step S1007, the CPU 109 selects, from the random number seed candidates stored in the external memory 111, k random number seed candidates in the descending order of the evaluation value as "random number seeds for generating base vectors E1 to Ek constituting a projection matrix W". The CPU 109 stores sets of the k selected random number seed candidates and the bias terms generated in step S1002 and respectively corresponding to the random number seed candidates in the external memory 111 in a format shown in FIG. 14. The parameters about the period and feedback arrangement are also stored in association with the sets.

It is possible to generate, from the random number seeds, the same base vectors as those evaluated and selected at the time of the learning processing by executing the series of processes described in the first embodiment using the parameters and random number seeds registered in the external memory 111 in this embodiment.

Note that a method of selecting base vectors is not limited to the above one. Various selection methods are plausible in accordance with applications. For example, in this embodiment, among the random number seed candidates, k random number seed candidates are selected in the descending order of the evaluation value. However, k random number seed candidates whose evaluation value is equal to or larger than a predetermined value may be sequentially selected. Furthermore, in this embodiment, a case in which random number seeds are generated in advance as candidates, and a base vector based on each random number sequence is evaluated has been explained. However, another method may be used. For example, it is possible to use a method of sequentially generating base vectors by cutting out a random number sequence of a predetermined length from a random number sequence based on one random number seed. In this case, internal state information of a random number generator (a register value for a linear feedback register) is extracted for each unit for cutting out a random number sequence of the predetermined length, and the information is used as a random number seed corresponding to a base vector.

[Third Embodiment]

In this embodiment, a case in which the projection operation processing described in the first embodiment is applied to CNNs (Convolutional Neural Networks) will be explained. An example of the arrangement of the CNNs will be described with reference to FIG. 11. In this embodiment, the following description assumes that the CNNs detect a specific object from an input image.

Figure 11:
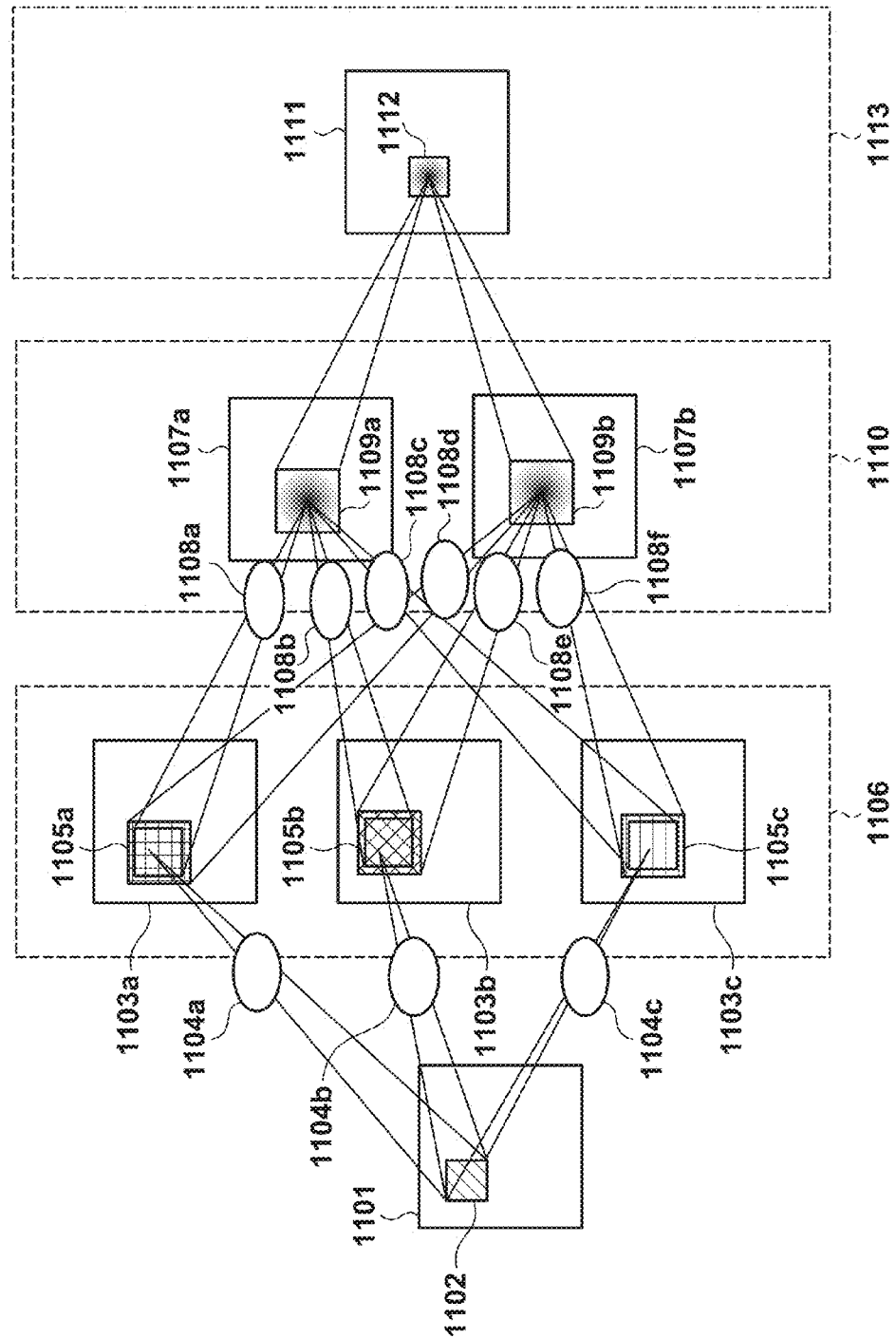
FIG. 11 is a view showing an example of the arrangement of CNNs.

The CNNs are formed from hierarchical feature extraction processing. FIG. 11 shows an example of three-layer CNNs in which the number of features of a first layer 1106 is 3, and the number of features of a second layer 1110 is 2, and the number of features of a third layer 1113 is 1. The CNNs are known as a method robust against variations of the appearance of a target object by the hierarchical feature extraction processing.

An image 1101 is input to the CNNs. Reference numerals 1103a to 1103c denote feature planes of the first layer 1106. The feature plane is an image data plane for storing a calculation result while scanning data of the previous layer using a predetermined feature extraction filter (the accumulated sum of convolution operations and nonlinear processing). The feature planes are detection results with respect to rater-scanned image data and, therefore, also express the detection results as planes. The feature planes 1103a to 1103c are calculated by different feature extraction filters with reference to the image 1101. The feature planes 1103a to 1103c are generated by two-dimensional convolution filter operations schematically corresponding to convolution filters 1104a to 1104c, and the nonlinear transformation (sigmoid function or the like) of the operation results (to be referred to as nonlinear convolution operations hereinafter). Note that reference numeral 1102 denotes a reference image region required for the nonlinear convolution operations. A convolution filter operation having a filter size (the length in the horizontal direction and the height in the vertical direction) of 11×11 is processed by a product-sum operation. An operation result output (x, y) at the coordinates (x, y) is given by:

$$\text{output}(x, y) = \sum_{row=-rowSize/2}^{rowSize/2} \sum_{column=-columnSize/2}^{columnSize/2} \text{input}(x + \text{column}, y + \text{row}) \times \text{weight}(\text{column}, \text{row}) \quad (5)$$

where input (x, y) represents a reference pixel value at coordinates (x, y), weight (column, row) represents a weighting coefficient at coordinates (x+column, y+row), and columnSize=11 and rowSize=11 represent a filter size (the number of filter taps).

The convolution filters 1104a to 1104c have different coefficients. Note that the convolution filters also have different sizes depending on the layers. The CNNs generate the feature plane by repeating the product-sum operation while scanning a plurality of filters for respective pixels, and nonlinearly transforming the final product-sum result. When calculating each of the feature planes 1103a to 1103c, the number of connections with the previous layer is 1, and thus the number of filters is 1 (1104a). On the other hand, when calculating each of feature planes 1107a and 1107b, the number of connections with the previous layer is 3, and thus the calculation results of three convolution filters corresponding to convolution filters 1108a to 1108c or 1108d to 1108f are accumulated. That is, the feature plane 1107a is obtained by accumulating all outputs from the convolution filters 1108a to 1108c, and finally executing nonlinear transformation processing of the result. Reference numerals 1105a to 1105c denote reference image regions required for the nonlinear convolution operation of the second layer 1110. That is, the feature plane is calculated by following equation.

$$\text{feature}(x, y) = \text{sigmoid}\left(\sum_{k=1}^{feature\_number-1} \text{output}_k(x, y) + b\right) \quad (6)$$

where feature (x, y) represents a value at a position of interest (x, y) on a feature plane of a target layer of interest, output (x, y) represents a convolution operation result for a feature plane of the previous layer, Feature_number represents the number of connections with the previous layer, b represents a bias term, and sigmoid represents a sigmoid function.

In the third layer (a feature plane 1111), the existence likelihood of a detection target is calculated by nonlinear convolution operations for the feature planes 1107a and 1107b of the previous layer (1112). Note that equation (6) can be considered to be obtained by adding a nonlinear function operation to the total sum (the number i of connections with the previous layer) of the projection operations indicated by equation (1) by setting one convolution filter as a base vector (equation (7)). That is, the nonlinear convolution operation can be defined as a nonlinear projection operation (the number of dimensions after projection corresponds to the number of feature planes). A nonlinear convolution operation result P at a position of interest on a feature plane to be calculated is given by:

$$p = \text{sigmoid}\left(\sum_i E_i^T X + b\right) \quad (7)$$

where Ei represents a filter coefficient (base vector), X represents a filter reference region on a feature plane of the previous layer, and b represents the bias term.

In general, the coefficient Ei (=weight) of the convolution filter is learnt by back propagation or the like. On the other hand, as disclosed in non-patent literature 2, it is known that a satisfactory detection performance is indicated even if a random number is used as a coefficient "weight" of a lower layer (in this embodiment, the first layer 1106 or the second layer 1110). In this embodiment, assume that the coefficients of the convolution filters 1104a to 1104c and 1108a to 1108f of the first layer 1106 and second layer 1110 are generated based on random numbers.

Figure 12:
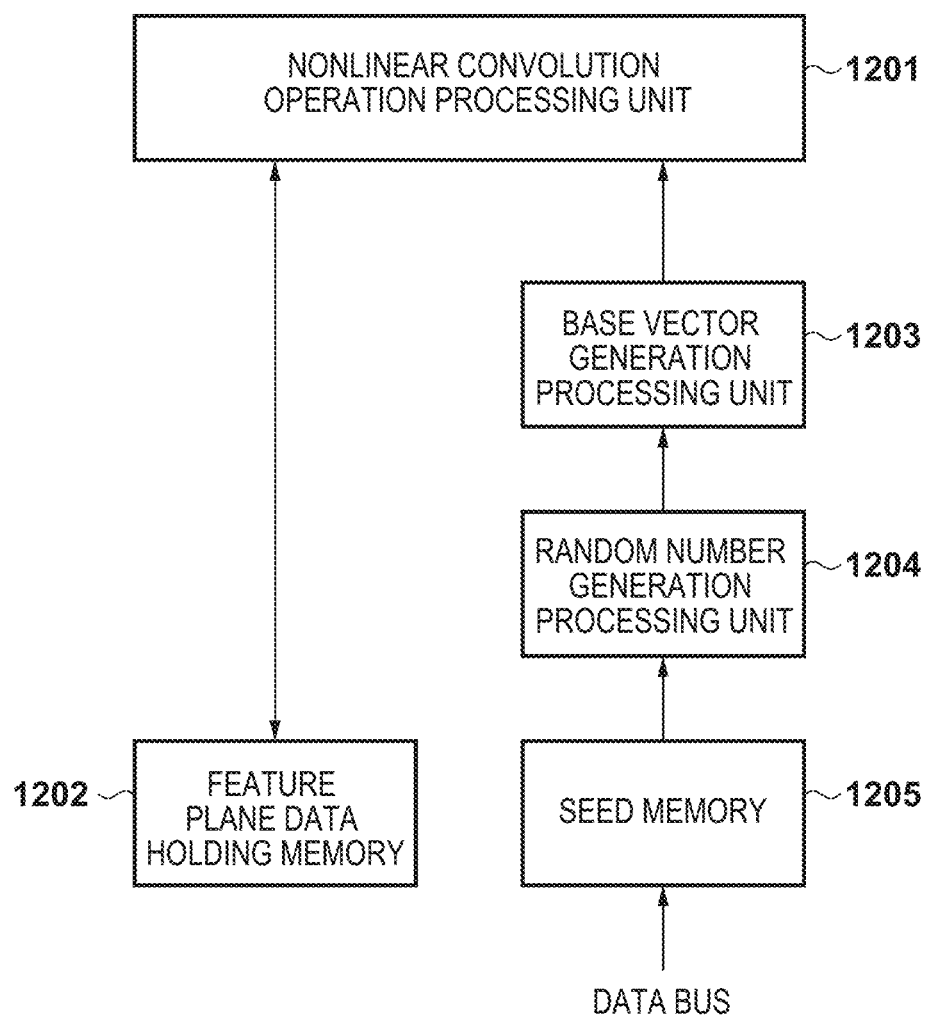
FIG. 12 is a block diagram showing an example of the arrangement of a circuit when implementing the CNNs using hardware.

An example of the arrangement of a circuit when implementing the above CNNs using hardware will be described with reference to FIG. 12. A nonlinear convolution operation processing unit 1201 executes the nonlinear projection operation indicated by equation (7) above. The nonlinear convolution operation processing unit 1201 includes an inner product operation unit, accumulator, and nonlinear transformation unit. A feature plane data holding memory 1202 is a memory for storing feature planes 1103a to 1103c, 1107a, 1107b, and 1111 obtained by nonlinear convolution operations. A seed memory 1205 stores a random number seed group and bias terms for generating base vectors corresponding to the filter coefficients of the convolution operations based on random numbers. The seed memory 1205 is implemented by a ROM, a high-speed SRAM, or the like. If the seed memory 1205 is implemented by an SRAM, random number seeds stored in a storage unit (not shown) are transferred in advance via a data bus for each layer process. A random number generation processing unit 1204 sequentially reads out the random number seeds stored in the seed memory 1205, and generates random number sequences based on the random number seeds. A base vector generation processing unit 1203 generates base vectors as filter coefficients based on the random number sequences generated by the random number generation processing unit 1204. Note that the random number generation processing unit 1204 and base vector generation processing unit 1203 are the same as the random number generation processing unit 106 and base vector generation processing unit 105 shown in FIG. 1, respectively.

Figure 13:
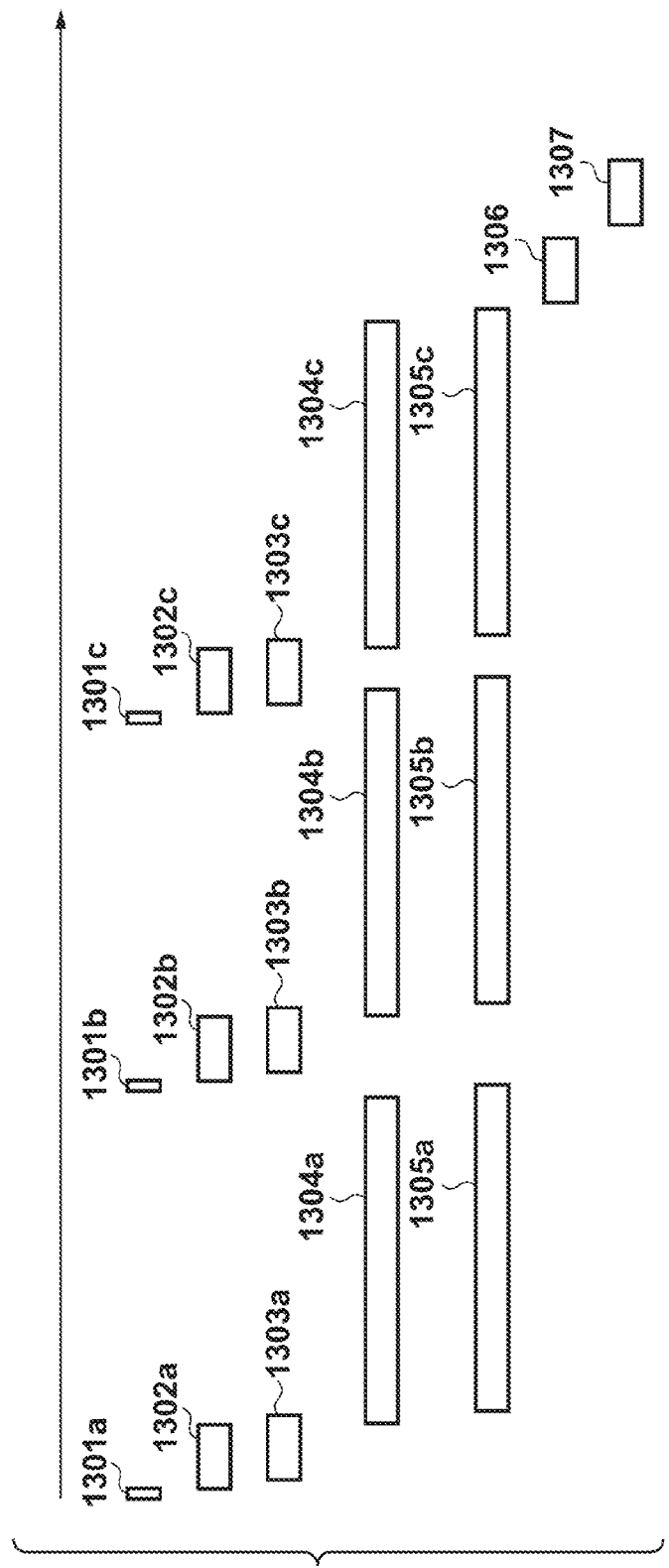
FIG. 13 is a view for schematically explaining the operation timings of the CNN circuit.

FIG. 13 is a view for schematically explaining the operation timings of the CNN circuit. FIG. 13 shows a case in which a value at one point of interest on the feature plane 1107a is calculated. Seed data readout processing 1301a reads out a random number seed corresponding to the coefficient of the filter operation of the convolution filter 1108a from the seed memory 1205. Reference numeral 1302a denotes an operation period of the random number generation processing unit 1204 during which processing of generating a random number sequence based on the random number seed read out in the processing 1301a is performed. Reference numeral 1303a denotes an operation period of the base vector generation processing unit 1203, during which a base vector corresponding to the coefficient of the convolution filter 1108a is generated based on the random number sequence generated by the random number generation processing unit 1204. That is, a filter coefficient sequence is extracted from the random number sequence under a predetermined condition. Reference numeral 1304a denotes a data readout period from the feature plane data holding memory 1202. In this example, region data of the feature plane corresponding to the reference image region 1105a is read out. Reference numeral 1305a denotes an operation period of the nonlinear convolution operation processing unit 1201. During this period, an inner product operation of the filter coefficient generated by the base vector generation processing unit 1203 and the feature data of the previous layer read out from the feature plane data holding memory 1202 is executed, and the result is stored in the accumulator. Similarly, the filter operation of the convolution filter 1108b is executed for the reference image region (feature) 1105b of the previous layer at timings of 1301b to 1305b, and the result is accumulated. Furthermore, the filter operation of the convolution filter 1108c is executed for the reference image region (feature) 1105c of the previous layer at timings of 1301c to 1305c, and the result is accumulated. Reference numeral 1306 denotes a timing at which nonlinear transformation processing of the accumulated sum of the three filter operation results is performed. Note that bias terms are stored in a memory (not shown) for the respective layers, and added at the timing 1306. The accumulation result obtained by performing the nonlinear transformation processing is stored in the feature plane data holding memory 1202 at a timing 1307. The above processes are performed in the raster scan order to calculate the feature plane 1107a.

As described above, the CNNs implement object detection and the like by hierarchically repeating the nonlinear convolution operation with reference to the feature plane data stored in the feature plane data holding memory 1202. Note that FIG. 11 shows the simplified structure of the CNNs for the descriptive purpose. In general, however, a multilayer network having a number of feature planes forms the CNNs. If a multilayer network having a number of feature planes forms the CNNs, the memory capacity for holding the filter coefficients of the convolution operations increases the cost. In this embodiment, in the CNN circuit based on the random numbers, it is possible to largely reduce the circuit scale of the memory by holding the filter coefficients of a plurality of filter kernel groups as random number seeds. If the coefficients are held in an external memory or the like, it is possible to reduce the transfer cost.

[Modifications of First to Third Embodiments]

Various modifications of the above embodiments can be considered. For example, in the above embodiments, the information processing apparatus (CNN circuit) targets image data. The present invention, however, is not limited to this, and various data such as voice data, text information, and time-series signal data from which a feature vector can be extracted can be targeted.

In the above embodiment, a case in which random number seeds corresponding to base vectors are stored in the external memory 111 has been explained. However, a ROM may be provided in the information processing apparatus instead of the external memory 111, and random number seeds may be stored in the ROM. In this case, it is possible to largely decrease the size of the ROM.

In the above embodiments, a method of generating one base vector based on one random number seed and a method of generating one base vector based on a plurality of random number seeds (for normal random numbers) have been described as a method of generating a base vector based on a random number seed. However, a method of generating a base vector based on a random number seed is not limited to them. For example, a predetermined set of a plurality of base vectors may be generated based on one random number seed. The relationship between a random number seed and a base vector is arbitrary depending on a base vector generation method at the time of learning.

In the above embodiments, a method of generating an M-sequence random number by a linear feedback register has been explained. The present invention, however, is not limited to this. Any random number generation method uniquely determined based on a random number seed may be used.

In the first embodiment, a case in which the seed buffer 107 is implemented by a double buffer memory has been explained. However, for example, random number seeds may be directly stored in the random number generation processing unit 106 without providing the seed buffer 107. Furthermore, in the first embodiment, a case in which the projection vector P is generated has been described. However, each element of the projection vector P may be binarized, and used as a hash value.

In the third embodiment, a case in which the present invention is applied to the CNNs has been explained. However, it is possible to cope with various processes including a plurality of convolution operation processes using coefficients based on random numbers. The present invention may be applied to a general multi layer perceptron type neural network. In this case, connection coefficient sequences for the neuron values of the previous layer for calculating one neuron value in the hierarchical neural network correspond to the above base vectors. Furthermore, the present invention may be applied to Recursive Neural Networks and the like disclosed below.

Socher, R., Manning, C. D., and Ng, A. Y. "Learning continuous phrase representations and syntactic parsing with recursive neural networks" in Deep Learning and Unsupervised Feature Learning Workshop, 2010.

The respective units of the operation unit 101 may be implemented by hardware. One or more of the units except for the seed buffer 107 may be implemented by software (computer programs). In this case, the computer programs are stored in the external memory 111. When the CPU 109 executes the computer program, it is possible to implement the function of the corresponding function unit. In this case, this is effective for, for example, a case in which a processing apparatus including a multiprocessor performs space division processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-073728, filed Mar. 31, 2014 which is hereby incorporated by reference herein in its entirety.

What is claimed is:

1. An information processing apparatus comprising:
at least one memory storing computer executable instructions; and
at least one processor which executes the computer executable instructions to cause the information processing apparatus to:
acquire respective feature vectors from a plurality of blocks in an image;
obtain an evaluation value for each of a plurality of random number seed candidates, based on a result of an inner product operation of a base vector and a feature vector;
select candidates from the plurality of random number seed candidates, based on the evaluation values;
register the selected candidates in an external memory as a plurality of random number seeds;
transfer the plurality of random number seeds from the external memory to an internal buffer, each of the plurality of random number seeds corresponding to a respective one of a plurality of base vectors;
generate a plurality of random number sequences using the plurality of random number seeds transferred from the external memory to the internal buffer;
generate the plurality of base vectors based on the plurality of generated random number sequences; and
transform each of the feature vectors into a lower-dimensional vector by performing random projection for each of the feature vectors using the plurality of generated base vectors.

2. The apparatus according to claim 1, wherein, for each of the feature vectors, the feature vector is transformed into a lower-dimensional vector by performing an inner product operation of each of the plurality of base vectors and the feature vector.

3. The apparatus according to claim 1, wherein the plurality of generated random number sequences is used as the plurality of generated base vectors.

4. The apparatus according to claim 1, wherein an average random number sequence is obtained from the plurality of generated random number sequences, and the plurality of base vectors are extracted from the obtained average random number sequence.

5. The apparatus according to claim 1, wherein the base vectors are filter coefficients used for convolution operations.

6. The apparatus according to claim 1, wherein the base vectors are filter coefficients used in convolutional neural networks.

7. The apparatus according to claim 1, wherein the base vectors are connection coefficient sequences for neuron values of a previous layer for calculating one neuron value in a hierarchical neural network.

8. The apparatus according to claim 1, the at least one processor further causing the information processing apparatus to
identify an object in the image based on the lower-dimensional feature vector.

9. An information processing method for an information processing apparatus, comprising:
acquiring respective feature vectors from a plurality of blocks in an image;
obtaining an evaluation value for each of a plurality of random number seed candidates, based on a result of an inner product operation of a base vector and a feature vector;
selecting candidates from the plurality of random number seed candidates, based on the evaluation values;
registering the selected candidates in an external memory as a plurality of random number seeds;
transferring the plurality of random number seeds from the external memory to an internal buffer, each of the plurality of random number seeds corresponding to a respective one of a plurality of base vectors;
generating a plurality of random number sequences using the plurality of random number seeds transferred from the external memory to the internal buffer;
generating the plurality of base vectors based on the plurality of generated random number sequences; and transforming each of the feature vectors into a lower-dimensional vector by performing random projection for each of the feature vectors using the plurality of generated base vectors.

10. A non-transitory computer-readable storage medium storing a computer program for causing a computer to perform
   acquiring respective feature vectors from a plurality of blocks in an image;
   obtaining an evaluation value for each of a plurality of random number seed candidates, based on a result of an inner product operation of a base vector and a feature vector;
   selecting candidates from the plurality of random number seed candidates, based on the evaluation values;
   registering the selected candidates in an external memory as a plurality of random number seeds;
   transferring the plurality of random number seeds from the external memory to an internal buffer, each of the plurality of random number seeds corresponding to a respective one of a plurality of base vectors;
   generating a plurality of random number sequences using the plurality of random number seeds transferred from the external memory to the internal buffer;
   generating the plurality of base vectors based on the plurality of generated random number sequences; and
   transforming each of the feature vectors into a lower-dimensional vector by performing random projection for each of the feature vectors using the plurality of generated base vectors.

11. An information processing apparatus comprising:
   at least one memory storing computer executable instructions; and
   at least one processor which executes the computer executable instructions to cause the information processing apparatus to:
      generate, for each of a plurality of random number seed candidates, a random number sequence using the candidate, generate a base vector based on the random number sequence, and obtain an evaluation value for the candidate based on a result of an inner product operation of the base vector and a feature vector extracted in advance from each of a plurality of learning images;
      select, from the plurality of random number seed candidates, based on the evaluation values, candidates the number of which corresponds to the number of dimensions of a vector to be transformed, and register the selected candidates in a memory as random number seeds;
      acquire a transformation source vector;
      generate a plurality of random number sequences using a plurality of random number seeds stored in the memory;
      generate a plurality of base vectors based on the plurality of random number sequences; and
      transform the transformation source vector into a lower-dimensional vector by performing random projection for the transformation source vector using the plurality of generated base vectors.

12. An information processing method for an information processing apparatus comprising:
   generating, for each of a plurality of random number seed candidates, a random number sequence using the candidate, generating a base vector based on the random number sequence, and obtaining an evaluation value for the candidate based on a result of an inner product operation of the base vector and a feature vector extracted in advance from each of a plurality of learning images;
   selecting, from the plurality of random number seed candidates, based on the evaluation values, candidates the number of which corresponds to the number of dimensions of a vector to be transformed, and registering the selected candidates in a memory as random number seeds;
   acquiring a transformation source vector;
   generating a plurality of random number sequences using a plurality of random number seeds stored in the memory;
   generating a plurality of base vectors based on the plurality of random number sequences; and
   transforming the transformation source vector into a lower-dimensional vector by performing random projection for the transformation source vector using the plurality of generated base vectors.

13. A non-transitory computer-readable storage medium storing a computer program for causing a computer to perform:
   generate, for each of a plurality of random number seed candidates, a random number sequence using the candidate, generate a base vector based on the random number sequence, and obtain an evaluation value for the candidate based on a result of an inner product operation of the base vector and a feature vector extracted in advance from each of a plurality of learning images;
   select, from the plurality of random number seed candidates, based on the evaluation values, candidates the number of which corresponds to the number of dimensions of a vector to be transformed, and register the selected candidates in a memory as random number seeds;
   acquire a transformation source vector;
   generate a plurality of random number sequences using a plurality of random number seeds stored in the memory;
   generate a plurality of base vectors based on the plurality of random number sequences; and
   transform the transformation source vector into a lower-dimensional vector by performing random projection for the transformation source vector using the plurality of generated base vectors.

* * * * *